US007184771B1

(12) United States Patent
Mouly et al.

(10) Patent No.: US 7,184,771 B1
(45) Date of Patent: Feb. 27, 2007

(54) METHOD AND SYSTEM FOR SUPPLYING SERVICES TO MOBILE STATIONS IN ACTIVE MODE

(75) Inventors: Michel Mouly, Palaiseau (FR); Denis Fauconnier, Saint-Remy-les-Chevreuses (FR)

(73) Assignee: Nortel Networks S.A., Guyancourt (FR)

( * ) Notice: Subject to any disclaimer, the term of this patent is extended or adjusted under 35 U.S.C. 154(b) by 0 days.

(21) Appl. No.: 09/958,588

(22) PCT Filed: Apr. 5, 2000

(86) PCT No.: PCT/FR00/00846

§ 371 (c)(1),
(2), (4) Date: Oct. 9, 2001

(87) PCT Pub. No.: WO00/62570

PCT Pub. Date: Oct. 19, 2000

(30) Foreign Application Priority Data

Apr. 9, 1999 (FR) .................................. 99 04470

(51) Int. Cl.
H04M 3/00 (2006.01)
H04Q 7/20 (2006.01)
H04Q 7/00 (2006.01)
(52) U.S. Cl. ...................... 455/450; 455/419; 455/418; 455/428; 370/329; 370/332

(58) Field of Classification Search ................ 455/450, 455/422, 428, 436, 33.1, 419, 432, 466, 477; 370/329, 458, 466, 465, 477
See application file for complete search history.

(56) References Cited

U.S. PATENT DOCUMENTS

| 5,926,469 A * | 7/1999 | Norstedt et al. ............ 370/329 |
| 5,930,721 A * | 7/1999 | Fried et al. ................. 455/466 |
| 5,940,756 A * | 8/1999 | Sibecas et al. ........... 455/426.1 |
| 6,456,843 B1 * | 9/2002 | Daly ........................... 455/419 |
| 6,512,922 B1 * | 1/2003 | Burg et al. .............. 455/432.1 |
| 2001/0041560 A1 * | 11/2001 | Tarkiainen et al. ......... 455/414 |
| 2004/0018829 A1 * | 1/2004 | Raman et al. .............. 455/406 |

FOREIGN PATENT DOCUMENTS

GB 2342816 A * 4/2000

* cited by examiner

Primary Examiner—Erika A. Gary
Assistant Examiner—Julio Perez
(74) Attorney, Agent, or Firm—Trop, Pruner & Hu, PC

(57) ABSTRACT

A radiocommunication infrastructure includes a core network comprising switches and subscriber management means and an access network comprising a plurality of base stations capable of communicating by radio with the mobile stations and base station control means. Messages pertaining to services of an idle mode type are: broadcast by one or more of the base stations to be received by mobile stations in idle mode; and/or transmitted by the base station towards at least one mobile station in active mode, for which the base station control means store radio link management information, if said management information includes references relating to the services to which the service messages pertain. These references are received by the control means during a setup procedure which has caused the mobile station to enter the active mode.

22 Claims, 1 Drawing Sheet

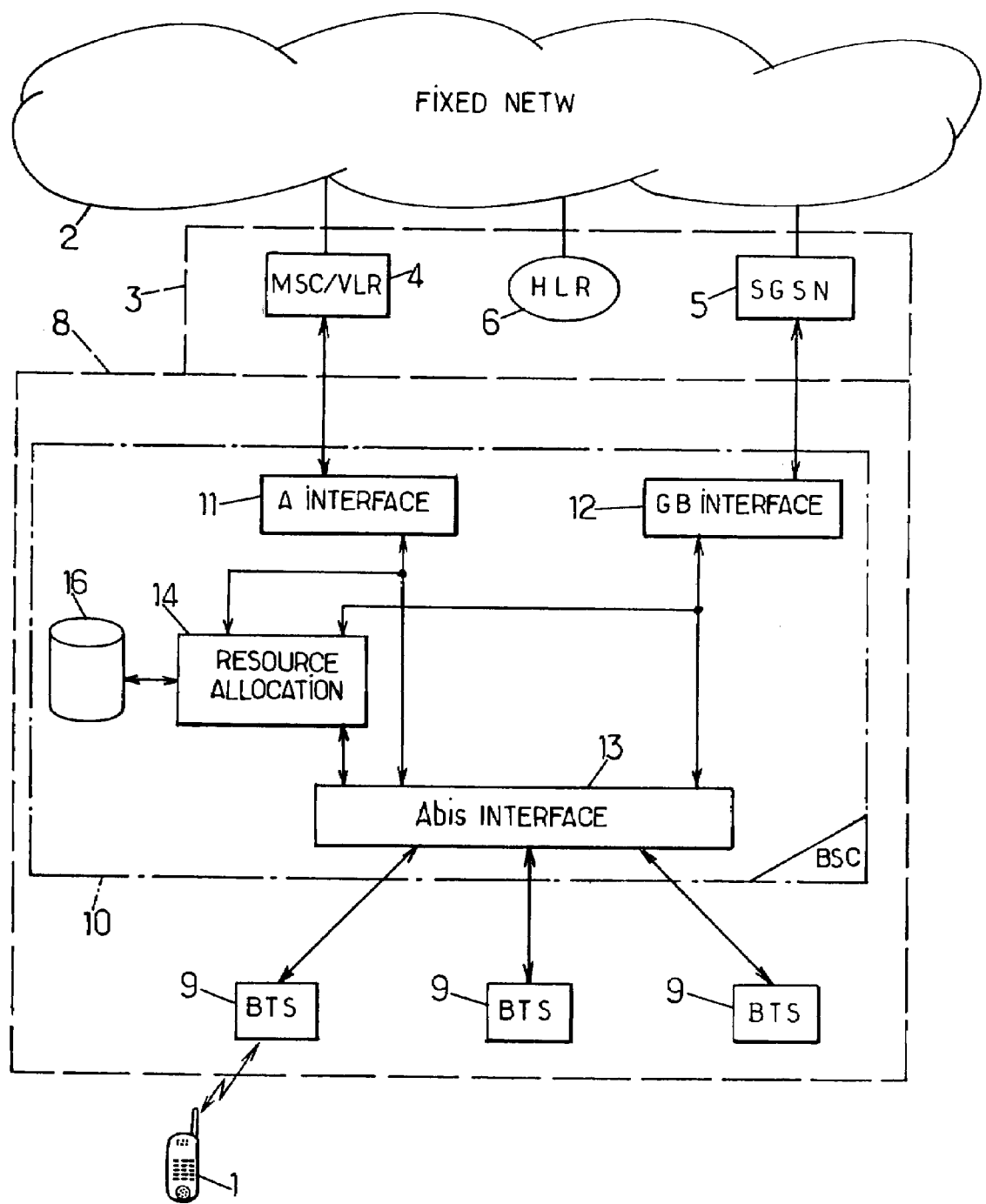

METHOD AND SYSTEM FOR SUPPLYING SERVICES TO MOBILE STATIONS IN ACTIVE MODE

BACKGROUND OF THE INVENTION

The present invention relates to the field of mobile radiocommunications.

It applies to networks in which the infrastructure is distributed between on the one hand a core network, which manages the data and states relating to the mobile subscribers and which provides the appropriate interfaces with the fixed transport networks, and on the other hand an access network comprising radio relays, or base stations, and their control equipment for managing the radio resources employed.

The invention applies in particular to cellular networks. In the case of GSM systems and derivatives, the access network is called the base station subsystem (BSS), and the core network includes mobile switching centers (MSC) for circuit mode communications and GPRS support nodes (GSN) for packet transmissions (GPRS, "General Packet Radio Service"). The invention is also applicable to third-generation cellular networks such as UMTS ("Universal Mobile Telecommunications System").

It is assumed that a mobile station (regarded as the combination of the mobile equipment or terminal and any subscription on which it acts) is essentially characterized in the access network by its active or inactive state.

When a mobile station is inactive for the access network, the latter does not store any specific data relating to this mobile station. A mobile station is thus regarded as inactive when it is off, or when it is on but out of range of a base station. Another case of inactive mobile station is that of an idle station, in which the station is on and within range of one or more base stations but without it being taken into account by the access network. In idle mode, a mobile station monitors, in particular, broadcasting channels over which the base stations transmit beacon signals, so that the best base station with which it is able to communicate is determined. It can on the other hand receive a certain number of services, among which may be mentioned "paging", by which the core network enquires as to the availability of a mobile station and may instruct it to adopt a certain behavior (for example in view of setting up a communication), or else the broadcasting of short messages (SMS-CB, "Short Message Service—Cell Broadcast"), etc. To supply such services to the idle mobile stations, for which it has no information, the access network uses communication resources (generally radio broadcasting channels) shared with a certain number of other mobile stations, also unknown to the access network. The service will be provided if the mobile station is actually idle in a cell whose base station has used the resources in question.

In active mode, a context relating to the mobile station is taken into account in the access network. Part of this context refers to the particular means of communication allocated to this mobile station (physical access resources, or addresses in the case of shared resources). In the case of GSM, this corresponds to the connected mode for a connection with an MSC, and to the active mode of GPRS for a communication with an SGSN ("Serving GSN").

The problem arises of the continuity of supply of the services normally provided to idle mobile stations when the latter are in active mode. A priori, provision may be made to allocate or to use dedicated channels or subchannels for exchanging the information regarding these services. This requires a certain coordination to manage the various items of information exchanged with the mobile station.

Some of the idle mode services are simply not supplied in active mode, such as for example the SMS-CB service in the known GSM networks.

In certain cases, the core network is responsible for the coordination. With a single switch, this implies that it must ensure the supply of the idle mode services to the active mobile stations. With several switches, this obliges them to cooperate for this purpose. An example of this is disclosed in WO97/26764, for the service of notification of incoming GSM calls to terminals in GPRS active mode. This type of coordination is very difficult to apply in a heterogeneous environment. In particular, it is problematic in the case of GSM since GSNs have been added to the MSCs, because the support of communication protocols between the MSCs and the GSNs is not mandatory. It is moreover a very complex process since it obliges the switches to know the configuration of the infrastructure and manage the consequences thereof.

Alternatively, the mobile stations may be responsible for the coordination. In the case of the GSM paging service, this is the solution mainly adopted hitherto so that the service can be supplied by an MSC for a mobile station communicating with an SGSN, or by an SGSN for a mobile station communicating with an MSC. The mobile station must then listen in to the idle mode resources, typically broadcasting channels, while it is otherwise in active mode. This type of solution leads to complex and expensive mobile stations and to non essential use of the precious access resources.

An object of the present invention is to provide a simple solution to the problem of the continuity of supply of services of idle mode type, and that this solution be readily compatible with various network organizations.

SUMMARY OF THE INVENTION

The invention thus proposes a method for supplying services to mobile stations from a radiocommunication infrastructure including on the one hand a core network comprising switches and subscriber management means, and on the other hand an access network comprising a plurality of base stations capable of communicating by radio with the mobile stations and base station control means. Messages pertaining to at least some of the services are:

broadcast by at least one of the base stations to be received by mobile stations in idle mode;

and/or transmitted by the base station towards at least one mobile station in active mode, for which the base station control means store radio link management information, if said management information includes references relating to the services to which said service messages pertain.

The references in question are received by the control means during a setup procedure which has caused the mobile station to enter the active mode.

When the mobile station enters the active mode, the access network is informed of the services of idle mode type which must be supplied to it or must continue to be supplied to it. When there is reason to transmit a message pertaining to such a service, the access network examines whether this message concerns an active mobile station, and as necessary, transmits the message in a manner suited to the active state, for example on a dedicated resource. To do this, there is no need to establish a dialogue with the switch, nor to use a radio broadcasting resource.

For one or more services, the references stored in the access network may comprise an address identifying the relevant active mobile station, or a group of mobile stations to which it belongs. An address of this type is included by the switch from which a service message originates so that the control means of the access network control the broadcasting and/or transmission thereof to the mobile station. The control means receiving the message from the switch examine whether they know the address included in the message as being part of the references relating to the service in respect of an active mobile station. If they do, the message is transmitted to the mobile station in a manner suited to the active state, for example on a dedicated resource. Otherwise, it is simply broadcast so that a mobile station may possibly pick it up if the station is in idle mode.

Certain other service messages may not be specifically intended for a mobile station (for example SMS-CB). Such messages will generally be broadcast by the base station and also transmitted to each active mobile station for which the base station control means store references relating to the service in question.

The method according to the invention is well suited to the case where one and the same mobile station includes a mobile equipment supporting a plurality of subscriptions. In this case, when the mobile station is active with regard to one of these subscriptions, said messages transmitted by the base station towards the mobile station may comprise messages pertaining to at least one service affiliated to another of these subscriptions. It is sufficient for the other subscriptions to be identified among the references supplied to the control means during the setup procedure.

In an advantageous embodiment, the mobile station in active mode receiving a message pertaining to one of the services returns a response to said message on a communication resource set up during the setup procedure. This avoids the use of a common signaling channel when a resource of the active mode is available.

Another aspect of the present invention concerns an access network equipment for a radiocommunication infrastructure, comprising means for controlling at least one base station of the access network, the control means comprising radio link supervision means arranged to store information elements respectively associated with mobile stations in active mode served by the base station, and means for controlling the broadcasting by the base station of messages pertaining to at least one service supplied in connection with mobile stations in idle mode, for which the radio link supervision means do not store any information. According to the invention, the information to be stored by the radio link supervision means comprise, for at least one mobile station in active mode, a list of references relating to services supplied in connection with mobile stations in idle mode, said list being addressed to the radio link supervision means in a setup procedure causing the mobile station to enter the active mode. The equipment further comprises means for controlling transmission by the base station, specifically towards a mobile station in active mode for which the radio link supervision means store a list of references, of messages pertaining to services to which references from said list refer.

A third aspect of the present invention concerns a mobile radiocommunication station, adapted to the provision of services in accordance with the above method, comprising means for transmitting, to a radiocommunication infrastructure during a setup procedure which causes said mobile station to enter an active mode, a list of references relating to services normally supplied to mobile stations in an idle mode, so that an access network of the infrastructure can take account thereof to transmit towards the mobile station in active mode messages pertaining to services for which references appear in the list.

BRIEF DESCRIPTION OF THE DRAWING

The sole FIGURE is a diagram of a GSM network infrastructure in which the invention may be implemented.

DESCRIPTION OF PREFERRED EMBODIMENTS

This FIGURE shows the functional architecture of the infrastructure enabling the GSM mobile stations 1 to communicate with fixed networks 2.

The core network 3 comprises switches 4, 5 referred to as MSCs in the case of the conventional circuit-mode service, and SGSNs in the case of the packet mode service (GPRS). The core network 3 also comprises databases for managing the subscribers, comprising one or more nominal registers 6, referred to as HLRs ("Home Location Register"), and visitor registers or VLRs ("Visitor Location Register"), frequently associated with switches.

The various units 4–6 of the core network 3 may communicate with one another by means of the fixed support networks 2.

The access network (BSS) 8 comprises the base transceiver stations (BTS) 9 distributed over the area to be covered, and whose radio ranges define the cells of the network. The BTSs 9 present the radio interface to the mobile stations 1. The BSS 8 also comprises equipment 10 referred to as BSCs ("Base Station Controller") which each control one or more BTSs 9 by way of a so-called Abis interface.

Each BSC 10 is linked to an MSC 4 by way of a so-called A interface. Each BSC controlling a zone where the packet-switched service is supplied by the operator is moreover linked to an SGSN 5 by way of a so-called GB interface.

The FIGURE also diagrammatically shows the functional organization of a BSC 10. The references 11, 12, 13 respectively designate the units of the BSC managing the exchanges over the A, GB and Abis interfaces.

An important function of the BSC is the supervision of the radio links between the BTS 9 and the mobile stations 1. The implementation of this function involves in particular a radio resource allocation module 14, which analyzes the information and instructions received on the A, GB and Abis interfaces, and applies the relevant procedures (allocation, power control, frequency hopping, handover, etc) to instruct the BTS 9 through the Abis interface. In particular, the module 14, which operates in conjunction with a local database 16 determines by means of which physical and/or logical radio channels the signals or information will have to be routed to the mobile stations.

These channels are dedicated resources in the case of the transmitting of information to one or more given mobile stations, which are then regarded as being in the active mode, or broadcasting channels in the case of inactive mobile stations for which the local database 16 contains no particular information.

For each mobile station which is active with regard to a BTS which it controls, the BSC stores in its database 16 a context including the identification of means which can be used to communicate specifically with this station. These means are typically a BTS 9 and a radio access resource of this BTS (frequency and timeslot index in the case of a mobile station which is active in circuit mode with an MSC, or routing address in the case of a mobile station which is active in the packet mode with an SGSN). Their allocation is decided by the module 14 during a procedure for setting up a circuit-mode connection (MSC case) or a virtual connection in packet mode (SGSN case).

A BTS must sometimes communicate service messages to mobile stations which are not active from the point of view of its BSC, that is to say those for which the database 16 contain no information. These messages come within the framework of services supplied to idle mobile stations. If the mobile station is actually in the idle mode in a cell where the message is broadcast, it will receive the information contained in the message and will, as necessary, adopt an appropriate response.

Certain of these service messages may be specifically intended for a mobile station (paging for example) or for a group of mobile stations (group calls for example). In this case, the corresponding instruction message received from the MSC or from the SGSN includes an address designating the mobile station or the destination group. The service message broadcast by the base station also includes this address, possibly translated into another form, so that the destination mobile station or stations may interpret the message as being intended for them if they are idle within the range of the base station.

Other service messages have no specific destination and are simply broadcast on common radio channels (SMS-CB for example) so as to be receivable by the idle mobile stations to which the service is of interest.

In accordance with the invention, provision is made such that in the setup procedure, by which a mobile station enters the active mode, a list of references relating to idle mode services are supplied to the BSC. This list may be empty or comprise references relating to one or more services which must continue to be supplied to the mobile station. Thereafter, the mobile station being active, should it be necessary to deliver a message to it pertaining to such a service referenced in the list, the BSC will instruct the BTS to the effect that the message be transmitted to the mobile station on a dedicated resource. Thus, it is the access network, more particularly the BSC, which has the job of coordinating the supply of idle mode services to the active mobile stations.

The list of references relating to the services forms part of the context which the database 16 stores in relation to each active mobile station.

In the case of a service whose messages are specifically intended for an active mobile station (or for a group of mobile stations of which it is part), the references stored by the BSC in respect of a mobile station such at this comprise, implicitly or explicitly, the address designating the mobile station or the group in question.

To illustrate this, the case of the paging service in GSM networks will be considered.

A mobile station paging request, transmitted by the MSC or the SGSN to the BSC on the A or GB interface, contains, in addition to an indication of the geographical zone wherein one expects to find the mobile station, two identification parameters, namely: (i) a part of the radio paging message to be broadcast so that the relevant mobile station recognizes itself as a destination; and (ii) a parameter making it possible to determine which broadcasting resources are monitored by the mobile station so as to receive any paging messages. In the current GSM specifications published by the ETSI, the first parameter is the temporary mobile subscriber identity (TMSI), or the equivalent thereof for the packet mode (P-TMSI), or sometimes the permanent mobile subscriber identity (IMSI, "International Mobile Subscriber Identity"). The second parameter is the IMSI which, by an arithmetic formula, makes it possible to determine the paging subchannels which the mobile station is listening to.

Using the first parameter as address stored by the BSC for the paging service is not a good solution because various forms of this first parameter may be used by the switch from which the request originates.

It is conceivable to use the second parameter as stored paging address. In the current specifications, this would then be the IMSI, which identifies the mobile station in a one-to-one manner.

The paging address could finally be an additional parameter to be inserted by the switches in their paging requests. It may happen that this additional parameter coincides with one of the two previous ones, but not routinely. The IMSI is a good choice for this additional parameter. In this case, with the current GSM specifications, there is no difference as compared with the previous case where use is made of the second parameter identifying the broadcasting resources monitored by the mobile station. However, in other systems, or assuming a modification of the GSM specifications with regard to this matter, recourse to the IMSI as additional parameter should be mentioned as very suitable. From the point of view of the coding of the request message by the MSC or the SGSN, it is not necessary to duplicate the identities, a short indication (for example one or two bits) simply being insertable into this message to distinguish the cases where "the paging address" coincides with the value of another field of the message from those where the value is supplied explicitly.

On receipt of the request, the BSC recovers the paging address then examines whether this address appears in its database 16 among the references relating to the paging service for an active mobile station. If it does, the BSC controls the BTS with which the active mobile station is communicating so that it transmits the paging message to it on a dedicated resource (for example an associated signaling channel of the SACCH type). The paging message is then not broadcast. Otherwise, the destination mobile station is inactive and the paging message is broadcast normally.

When the paging message is transmitted to the mobile station in active mode by using a downlink dedicated resource (for example a downlink SACCH channel), the mobile station can, when a response is required, return this response by making symmetrical use of a corresponding already set up uplink dedicated resource (for example an uplink SACCH channel). In this case, the BSC is adapted so as to be capable of routing distinct streams received on one and the same logical signaling channel to different switches.

For the group call notification service, the manner of ensuring the continuity of the service in respect of the active mobiles is essentially the same as for the paging service, the address used for the service being an explicit group identity which is not necessarily part of the notification message to be broadcast.

However, the notification message is also broadcast by the access network so as possibly to be receivable by other idle mobile stations which are part of the group.

Other services normally supplied to the idle mobile stations do not involve the transmission of radio messages intended specifically for one or more mobile stations, such as for example the SMS-CB service or the broadcasting of information serving for system management (SYSINFO).

According to the invention, these message remain broadcast by the access network in all circumstances, but they may also be transmitted to the active mobiles for which the access network stores the relevant references.

For these services, the references from the list stored for the active mobile stations will not necessarily comprise an address. It is also possible to use a default address value designating all the mobile stations. If the messages pertaining to such a service are intended for certain subscribers only, typically those who have signed up to the service, it is possible to store an address serving to distinguish the mobiles of these subscribers, thereby avoiding the transmission of the messages to irrelevant mobile stations. In this latter case, the solution resembles that set forth hereinabove for group call notifications.

In a first embodiment of the invention, the list of references relating to the services forms part of the subscriber data managed by the core network. It can then be stored in the HLR and the VLR. The switch 4, 5 supplies it to the BSC 10 in the course of the setup procedure when the mobile station becomes active. It is then necessary to establish the setup procedure at the A and GB interfaces so as to provide for the supplying of this list in one of the messages transmitted from the switch.

Alternatively, it can be provided that, during setup, the BSC interrogates a server dedicated to the supplying of these references by identifying the mobile station concerned. This server responds to such an interrogation by returning the relevant data.

In another embodiment of the invention, the mobile station becoming active supplies the list of references to the services and the corresponding addresses itself during the setup procedure. This solution consumes radio transmission resources, but it has several advantages: it is sufficient to keep the list in only one place (the subscriber module SIM of the mobile station) rather than at various sites of the core network; the list can be modified dynamically by the user (for example depending on whether or not he agrees to be distracted by this or that service while communicating) without this requiring any signaling; the addition of new idle mode services has no impact other than on equipment directly relevant to such new services.

Coming back to the example of the current GSM specifications, each mobile station already supplies an identity during the setting up of a connection, in the SABM message. This identity is formed, depending on circumstances, by the TMSI, the P-TMSI, the IMSI or the IMEI ("International Mobile Equipment Identity"). It is used by the switch 4, 5 to identify the mobile station uniquely, and by the BSS 8 to resolve conflicts between mobiles on random access channels. In fact, the BSS does not identify the mobile on this basis: it simply copies into the UA message returned the identity contained in the processed SABM message, so that any mobile stations in conflict are aware that their random access has not been taken into account.

It is conceivable for the BSC to store this identity as address for paging (or other services). However, this is acceptable only if the same address is actually included in the paging requests dispatched by the switches to the BSCs, this not always being the case. This approach still leaves cases where the paging message are not transmitted to the active mobile stations (for example paging arising from an SGSN although the mobile is communicating with an MSC.

Another solution is that, as necessary, the mobile station supply its paging address independently of the current characteristics of the random access procedure. It is then possible to use any appropriate address, in particular the IMSI which, as was seen, is a good choice from the point of view of the network. Advantageously, this address will be supplied by the mobile station in enciphered form, for example as data included in the CIPHER_MODE_COMPLETE message which, in the standardized setup procedure (GSM 04.08) is often the first message sent by the mobile station in enciphered form. On receipt of this message, the BSC deciphers it, recovers the paging address and stores the latter in the database 16. Alternatively, the address could be transmitted by the mobile in a new message, preferably a non priority message, so as not to delay the connection setup.

The characteristics of the invention are well suited to the case where several subscribers use the same mobile equipment (multiple SIMs, or SIMs supporting different subscriptions). The list of references is then the union of the lists relating to the services affiliated to the various subscriptions. This ensures in particular that a subscriber's paging message may be received although the mobile station is active in respect of another subscriber.

The invention applies independently of the nature of the nodes of the core network requesting active mode services and idle mode services from the access network, and regardless of the multiplicity of these nodes. It is suitable in particular when core network nodes managed by various operators are linked to the same access network, especially in the case where the lists of references are supplied by the mobile stations.

The invention claimed is:

1. A method for supplying services to mobile stations from a radiocommunication infrastructure, said services including at least one idle mode service supplied in connection with mobile stations in an idle mode, said infrastructure including a core network and an access network, the core network comprising switches and subscriber management means, the access network comprising a plurality of base stations capable of communicating by radio with the mobile stations and base station control means storing radio link management information for mobile stations in an active mode, the method comprising the steps of:

receiving service references at the control means during a setup procedure which causes a mobile station to enter an active mode, the received service references including references relating to at least one idle mode service;

including said service references in the management information stored for said mobile station; and transmitting messages pertaining to at least some of the services an idle mode service from at least one of the base stations towards at least one recipient mobile station in active mode if the management information stored for said recipient mobile station includes service references relating to the services to which said idle mode service messages pertain.

2. The method as claimed in claim 1, wherein at least some of said messages are further broadcast by at least one of the base stations to be received by mobile stations in idle mode.

3. The method as claimed in claim 1, wherein the references relating to at least one of the services the idle mode service are supplied to the control means from said mobile station through a signaling radio link with the base station.

4. The method as claimed in claim 3, wherein the references relating to at least one of the services the idle mode service are supplied in enciphered form by the mobile station.

5. The method as claimed in claim 1, wherein the references relating to at least one of the services the idle mode service are supplied to the control means from a switch of the core network.

6. The method as claimed in claim 1, wherein the references relating to at least one of the services the idle mode service are supplied to the control means in response to an interrogation of a server effected by identifying said mobile station.

7. The method as claimed in claim 1, wherein the references relating to at least one of the services the idle mode service for a mobile station comprise an address identifying said mobile station in active mode or a group of mobile stations to which said mobile station belongs, and wherein said address is included by a switch of the core network in a message dispatched to the control means to control the broadcasting and/or transmission of a message pertaining to said idle mode service.

8. The method as claimed in claim 7, wherein the messages pertaining to at least one the idle mode service for which the control means of the base station store references comprising an address are transmitted by the base station to said mobile station in active mode without being broadcast.

9. The method as claimed in claim 1, wherein the messages pertaining to at least one of the services an idle mode service are broadcast by the base station and also transmitted to each mobile station in active mode for which the base station control means store references relating to said idle mode service.

10. The method as claimed in claim 1, wherein said mobile station in active mode comprises a mobile equipment supporting a plurality of subscriptions, and wherein, the mobile station being active with regard to one of said subscriptions, said messages transmitted by the base station towards the mobile station comprise messages pertaining to at least one idle mode service affiliated to another of said subscriptions.

11. A method as claimed in any one of claim 1, further comprising the step of returning, from a mobile station in active mode receiving a message pertaining to one of the services an idle mode service, a response to said message on a communication resource set up during the setup procedure which has caused the mobile station to enter the active mode.

12. An access network equipment for a radiocommunication infrastructure, comprising means for controlling at least one base station of the infrastructure, the control means comprising radio link supervision means arranged to store information elements respectively associated with mobile stations in active mode served by the base station, and means for controlling the broadcasting by the base station of messages pertaining to at least one idle mode service supplied in connection with mobile stations in idle mode, for which the radio link supervision means do not store any information, wherein the information to be stored by the radio link supervision means comprise, for at least one mobile station in active mode, a list of references relating to idle mode services supplied in connection with mobile stations in idle mode, said list being addressed to the radio link supervision means in a setup procedure causing the mobile station to enter the active mode, and the equipment further comprising means for controlling transmission by the base station, specifically towards a mobile station in active mode for which the radio link supervision means store a list of references, of messages pertaining to idle mode services to which references from said list refer.

13. The equipment as claimed in claim 12, wherein, for at least one of the idle mode services, the stored references comprise an address identifying the mobile station in active mode or a group of mobile stations to which said mobile station in active mode belongs, and wherein the supervision means are arranged to receive, from a switch of a core network of the radiocommunication infrastructure, control messages regarding said idle mode service each including an address comparable with the stored addresses and to control the transmission of a message pertaining to said idle mode service when the address included in a control message received matches the stored address identifying the mobile station in active mode.

14. The equipment as claimed in claim 13, wherein said address is a permanent mobile subscriber identity.

15. The equipment as claimed in claim 12, wherein, said mobile station in active mode comprising a mobile equipment supporting a plurality of subscriptions, and being active in regard to one of said subscriptions, said messages transmitted by the base station specifically towards the mobile station comprise messages pertaining to at least one idle mode service affiliated to another one of said subscriptions.

16. A mobile radiocommunication station, comprising means for transmitting, to a radiocommunication infrastructure during a setup procedure which causes said mobile station to enter an active mode, a list of references relating to idle mode services normally supplied to mobile stations in an idle mode, so that an access network in the infrastructure can take account thereof to transmit towards the mobile station in active mode messages pertaining to idle mode services for which references appear in the list and, for receiving, in an active mode, messages pertaining to idle mode services for which references appear in the list.

17. The mobile station as claimed in claim 16, wherein the references relating to at least one of the idle mode services comprise an address, so that the access network can compare said address with an address which it receives in a request to send a message pertaining to the referenced idle mode service so that the message is transmitted when the addresses match.

18. The mobile station as claimed in claim 17, wherein said address is a permanent mobile subscriber identity.

19. The mobile station as claimed in claim 16, wherein said transmission means comprise means for enciphering the transmitted list of references.

20. A mobile station as claimed in claim 19, wherein the list of references is included in the first message sent in enciphered form in the setup procedure.

21. The mobile station as claimed in claim 19, in the list of references is included in a non priority message sent in the setup procedure.

22. The mobile station as claimed in claim 16, comprising a mobile equipment supporting a plurality of subscriptions, and wherein the list of references sent during the setup procedure which causes said mobile station to enter the active mode with respect to one of said subscriptions comprises at least one reference relating to a an idle mode service affiliated to another one of said subscriptions.

* * * * *